United States Patent
Koral

(10) Patent No.: US 12,309,167 B2
(45) Date of Patent: May 20, 2025

(54) NETWORK ACCESS MANAGEMENT

(71) Applicant: AT&T Intellectual Property I, L.P., Atlanta, GA (US)

(72) Inventor: Yaron Koral, Cherry Hill, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 121 days.

(21) Appl. No.: 18/132,747

(22) Filed: Apr. 10, 2023

(65) Prior Publication Data

US 2024/0340289 A1 Oct. 10, 2024

(51) Int. Cl.
G06F 21/00 (2013.01)
H04L 9/40 (2022.01)

(52) U.S. Cl.
CPC .......... H04L 63/108 (2013.01); H04L 63/068 (2013.01)

(58) Field of Classification Search
CPC ............................. H04L 63/108; H04L 63/068
See application file for complete search history.

(56) References Cited

U.S. PATENT DOCUMENTS

| | | | | |
|---|---|---|---|---|
| 10,606,224 B2 * | 3/2020 | Rumble | ............... | G06Q 20/127 |
| 11,361,101 B2 * | 6/2022 | Vas | ..................... | G06F 21/6245 |
| 12,147,559 B1 * | 11/2024 | Rangappa | ............... | H04L 63/08 |
| 2013/0318573 A1 * | 11/2013 | Reunamaki | ........... | H04W 12/50 726/4 |
| 2014/0373121 A1 * | 12/2014 | Wied | .................. | H04L 63/0846 726/7 |
| 2015/0128219 A1 * | 5/2015 | Guday | .................. | H04W 12/08 726/4 |
| 2017/0076523 A1 * | 3/2017 | Rumble | .................... | G07C 9/28 |
| 2018/0307858 A1 * | 10/2018 | Vas | ..................... | G06F 21/6245 |
| 2019/0297115 A1 * | 9/2019 | Lin | ........................ | H04L 63/105 |
| 2021/0406382 A1 * | 12/2021 | Shah | ........................ | G06F 8/65 |
| 2022/0198860 A1 * | 6/2022 | Truong | .................... | G07C 9/28 |
| 2023/0128367 A1 * | 4/2023 | Iila | .......................... | H04L 67/52 726/1 |
| 2023/0283682 A1 * | 9/2023 | Scarborough | ........... | G07F 17/32 455/457 |

* cited by examiner

Primary Examiner — Kendall Dolly

(57) ABSTRACT

Network access management can include receiving a request to enable network access for a guest user device at a geographic location associated with a gateway device. Connection parameters can be defined, the connection parameters including an effective-from date and time and an effective-to date and time. Credentials associated with the guest user device can be stored with data defining limits associated with the network access for the guest user device, the limits including a date and time limit. The gateway device can detect a guest login using the credentials; enable network access for the guest user device; apply, to the network access, the limits; and determine if the date and time limit is satisfied. When the date and time limit is exceeded, the network access can be terminated and the credentials can be revoked.

20 Claims, 9 Drawing Sheets

NETWORK ACCESS MANAGEMENT

BACKGROUND

Hotels, vacation rentals, and some other locations may provide network connectivity to guests in the form of access to a WiFi gateway or the like. For security-enabled WiFi networks, providing such access can require owners or businesses to share various types of network information such as, for example, secure set identifiers ("SSIDs") of WiFi equipment, user logins, user passwords, or the like with the guests or renters. Sharing such information can be cumbersome for the owners of the hotels, vacation rentals, or other locations as these data must be communicated to the guests. Furthermore, sharing such information may expose the network to use or infiltration by unauthorized users including the renters or guests after their stay ends.

Additionally, owners or businesses may change or update security settings associated with their WiFi-enabled network or other network at various times. For example, if security settings associated with WiFi equipment are changed or updated, the owner may need to share updated security settings with guests or renters, which may be inconvenient for the owners or businesses. Some owners or businesses may wish to make the WiFi equipment public, without a password, to avoid the hassle of sharing a password, but such an approach can expose the network to risks such as unauthorized users connecting to the network, guests or renters leaving malicious hardware and/or software hidden on-site when leaving the premises, or the like.

SUMMARY

The present disclosure is directed to network access management. In some embodiments, the network access management includes issuing temporary or limited credentials for the network that will grant access for certain times and/or for certain activities. In some embodiments, a gateway device (e.g., a home gateway, a customer premises equipment ("CPE"), or other device) can be located at and associated with a geographic location such as, for example, a residence, an office, a store, a hotel, or the like. In some embodiments, the geographic location can be defined as the communication limits of the gateway device (e.g., a communication range of a transceiver of the gateway device). Thus, for example, a device may be considered to be "at the geographic location" if the device is within a communication range of the gateway device. It should be understood that this example is illustrative, and therefore should not be construed as being limiting in any way. A user or other authorized entity associated with the gateway device can communicate with the gateway device via a local network such as a WiFi connection, a BLUETOOTH connection, and/or other data communication technologies or methodologies (e.g., via a direct wireless or wired connection, via a web-enabled access portal, via combinations thereof, or the like).

The user device can communicate with a network access management application hosted and/or executed by the gateway device to manage network access for a guest user device that may be scheduled to be at the geographic location at some defined time period (e.g., a time period associated with a hotel reservation, a time period associated with a home rental, a time period associated with an office rental, a certain day or days, times, or the like). The user device can request that the gateway device provide network access to the guest user device. The user device and/or other entities can define various parameters associated with the network access being provided including, at least, dates and times on those dates during or for which the network access is to be allowed for the guest user device.

Other parameters can be tailored by owners or businesses to define for which purposes the guest users can or cannot use the network access; what device or devices (e.g., one or more guest user devices) can or cannot use the network access; what sites, resources, and/or geographic locations can be accessed via the network access being granted; and the like, all of which can be used to create limits associated with the network access being granted. The network access management application can be configured to create credentials for the guest user device in some embodiments, or the network access management application can be configured send a management request (which can include the various parameters and/or limits defined by the authorized user, owner, or other entity) to a network access management service. In some embodiments, the network access management service can be configured to create credentials for use in obtaining the network access. In yet other embodiments, a server or device such as a server computer that hosts the network access management service can expose an application programming interface ("API") via which the network access management application and/or an authorized user or entity can request creation of the credentials. The network access management service can provide copies of the credentials to the gateway device, one or more guest user device(s), and/or other entities. It should be understood that this example is illustrative, and therefore should not be construed as being limiting in any way.

The guest user device can enter the geographic location (e.g., a communication range of the gateway device), connect to the gateway device, and login or authenticate with the gateway device using the credentials. The network access management application can be configured to apply the limits to the network access obtained using the credentials and to determine, at various times and/or substantially continuously, if the access is occurring in compliance with the limits set by the owner or other authorized entity including, at least, the dates and times associated with the credentials. If the network access management application determines that the dates and times set for the credentials are not met at any point in time, the network access management application can terminate the access and/or revoke the credentials, thereby preventing the guest user device from using the gateway device using the credentials. Activity associated with the network access also can be limited by the gateway in accordance with the limits associated with the credentials, in some embodiments. If the credentials are revoked and/or access is terminated, the network access management application can be configured to send an update to the network access management service to update the credentials and/or other information stored at the server computer in some embodiments. It should be understood that this example is illustrative, and therefore should not be construed as being limiting in any way.

In some embodiments of the concepts and technologies disclosed herein, the time-limited network access credentials can be used to ensure that guests in a house, hotel, rental, or the like, are not able to access a network after their rental or stay has ended. Such an approach can be used to ensure that guests and/or renters are unable to leave at the rented premises web-enabled and/or web-connected devices such as cameras, key loggers, or the like. Thus, embodiments of the concepts and technologies disclosed herein can be used to enhance security of future users of the geographic location and/or the network, in some instances. In some other embodiments of the concepts and technologies disclosed herein, the data-limited network access credentials can be used to limit the consumption of bandwidth in a shared network (e.g., when a homeowner rents out a portion of his or her home to guests), or to otherwise enforce user limits on authorized guest users. It should be understood that these examples are illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include receiving a request to enable network access for a guest user device at a geographic location associated with a gateway device; and determining, for the network access for the guest user device, connection parameters. The connection parameters can include an effective-from date and time and an effective-to date and time. The operations can further include storing, at the gateway device, credentials associated with the guest user device. The gateway device can store data defining limits associated with the network access for the guest user device, and the limits can include a date and time limit including a time range for which the credentials are valid. The operations further can include detecting, at the gateway device, a guest login using the credentials; enabling the network access for the guest user device; applying, to the network access, the limits; determining, at the gateway device, if the date and time limit is satisfied; if a determination is made that the date and time limit are not satisfied, terminating the network access for the guest user device and revoking the credentials; and if a determination is made that the date and time limit are satisfied, continuing to enable the network access for the guest user device.

In some embodiments, the limits associated with the network access further can include a time limit including a total duration for which the network access has been used. In some embodiments, the limits associated with the network access further can include a data limit including a total amount of data transmitted by way of the network access. In some embodiments, the limits associated with the network access further can include a data limit, which can include a list of permissible sites and resources and a list of impermissible sites and resources for the guest user device to access using the network access. In some embodiments, determining the connection parameters can include interacting with a user device associated with an owner of the gateway device. The user device can present a user interface, which can include options for defining the effective-from date and time; the effective-to date and time; time limits associated with the network access for the guest user device; and data limits associated with the network access for the guest user device.

In some embodiments, the computer-executable instructions, when executed by the processor, can cause the processor to perform operations that further can include obtaining, from a network access management service, the credentials. The network access management service can generate the credentials by performing operations including receiving, from the gateway device, a management request, the management request including date and time information, user information, time information, and data limits; creating the credentials based on the management request; and providing a copy of the credentials to the gateway device. In some embodiments, revoking the credentials can include generating an update that can indicate that the credentials have been revoked; and sending the update to the network access management service.

According to another aspect of the concepts and technologies disclosed herein, a method is disclosed. The method can include receiving, at a gateway device that can include a processor, a request to enable network access for a guest user device at a geographic location associated with the gateway device; and determining, by the processor and for the network access for the guest user device, connection parameters. The connection parameters can include an effective-from date and time and an effective-to date and time. The method further can include storing, by the processor and at the gateway device, credentials associated with the guest user device. The gateway device can store data defining limits associated with the network access for the guest user device, and the limits can include a date and time limit, which can include a time range for which the credentials are valid. The method further can include detecting, by the processor and at the gateway device, a guest login using the credentials; enabling, by the processor, the network access for the guest user device; applying, by the processor and to the network access, the limits; determining, by the processor and at the gateway device, if the date and time limit are satisfied; if a determination is made that the date and time limit are not satisfied, terminating, by the processor, the network access for the guest user device and revoking the credentials; and if a determination is made that the date and time limit are satisfied, continuing, by the processor, to enable the network access for the guest user device.

In some embodiments, the limits associated with the network access further can include a time limit, which can include a total duration for which the network access has been used. In some embodiments, the limits associated with the network access further can include a data limit, which can include a total amount of data transmitted by way of the network access. In some embodiments, the limits associated with the network access further can include a data limit, which can include a list of permissible sites and resources and a list of impermissible sites and resources for the guest user device to access using the network access.

In some embodiments, determining the connection parameters can include interacting with a user device associated with an owner of the gateway device. The user device can present a user interface, which can include options for defining the effective-from date and time; the effective-to date and time; time limits associated with the network access for the guest user device; and data limits associated with the network access for the guest user device. In some embodiments, the method further can include obtaining, from a network access management service, the credentials. The network access management service can generate the credentials by performing operations including receiving, from the gateway device, a management request, the management request including date and time information, user information, time information, and data limits; creating the credentials based on the management request; and providing a copy of the credentials to the gateway device.

According to yet another aspect of the concepts and technologies disclosed herein, a computer storage medium is disclosed. The computer storage medium can store computer-executable instructions that, when executed by a processor, cause the processor to perform operations. The operations can include receiving a request to enable network access for a guest user device at a geographic location associated with a gateway device; and determining, for the network access for the guest user device, connection parameters. The connection parameters can include an effective-from date and time and an effective-to date and time. The operations can further include storing, at the gateway device, credentials associated with the guest user device. The gateway device can store data defining limits associated with the network access for the guest user device, and the limits can include a date and time limit including a time range for which the credentials are valid. The operations further can include detecting, at the gateway device, a guest login using the credentials; enabling the network access for the guest user device; applying, to the network access, the limits; determining, at the gateway device, if the date and time limit is satisfied; if a determination is made that the date and time limit are not satisfied, terminating the network access for the guest user device and revoking the credentials; and if a determination is made that the date and time limit are satisfied, continuing to enable the network access for the guest user device.

In some embodiments, the limits associated with the network access further can include a time limit including a total duration for which the network access has been used. In some embodiments, the limits associated with the network access further can include a data limit including a total amount of data transmitted by way of the network access. In some embodiments, the limits associated with the network access further can include a data limit, which can include a list of permissible sites and resources and a list of impermissible sites and resources for the guest user device to access using the network access. In some embodiments, determining the connection parameters can include interacting with a user device associated with an owner of the gateway device. The user device can present a user interface, which can include options for defining the effective-from date and time; the effective-to date and time; time limits associated with the network access for the guest user device; and data limits associated with the network access for the guest user device.

In some embodiments, the computer-executable instructions, when executed by the processor, can cause the processor to perform operations that further can include obtaining, from a network access management service, the credentials. The network access management service can generate the credentials by performing operations including receiving, from the gateway device, a management request, the management request including date and time information, user information, time information, and data limits; creating the credentials based on the management request; and providing a copy of the credentials to the gateway device. In some embodiments, revoking the credentials can include generating an update that can indicate that the credentials have been revoked; and sending the update to the network access management service.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
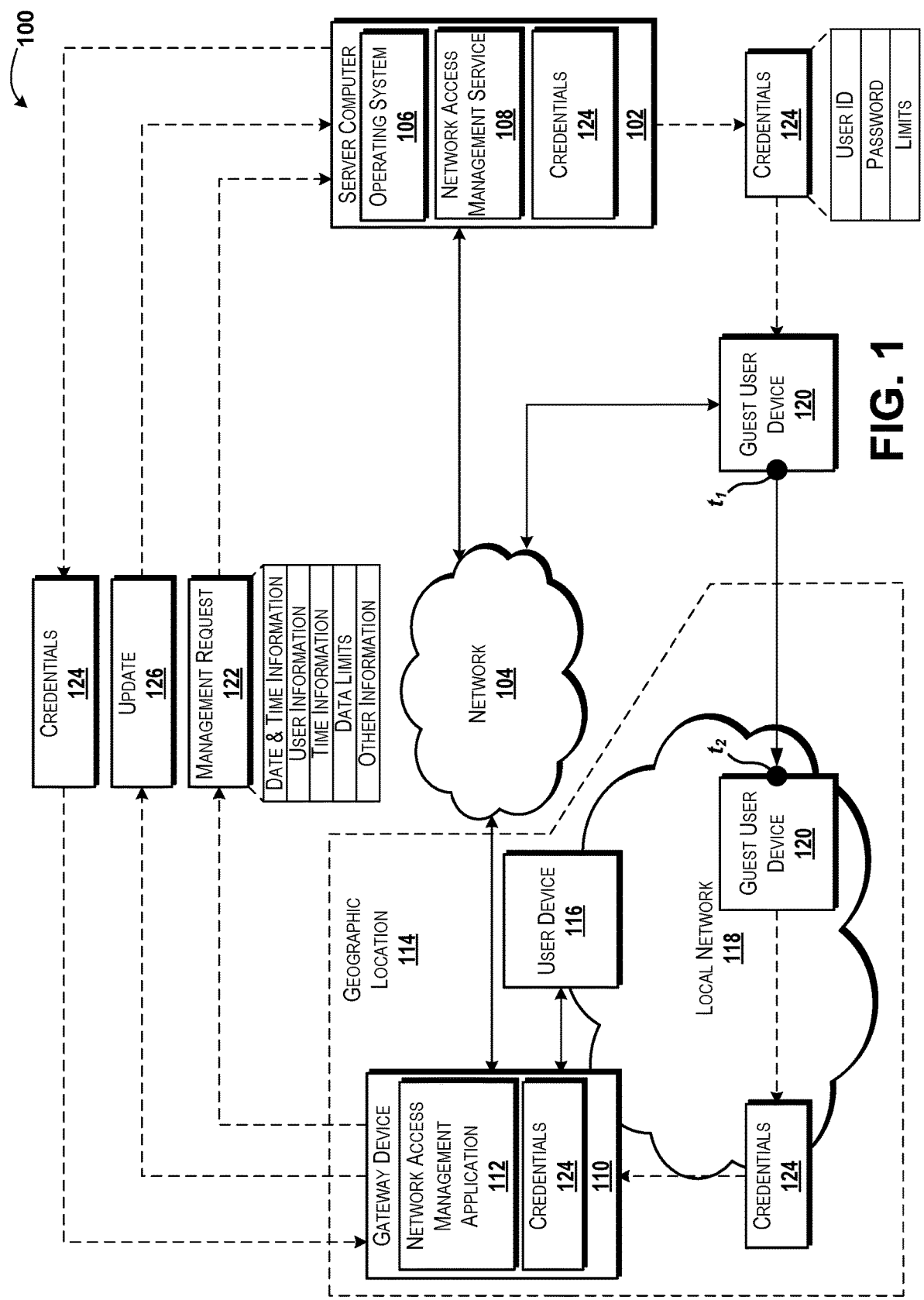
FIG. 1 is a system diagram illustrating an illustrative operating environment for various embodiments of the concepts and technologies described herein.

The following detailed description is directed to network access management. A gateway device can be located at and associated with a geographic location such as, for example, a residence, an office, a store, a hotel, or the like. In some embodiments, the geographic location can be defined as the extents of the communication range and/or communication limits of the gateway device. Thus, for example, a device may be considered to be "at the geographic location" if the device is within communication range of the gateway device. It should be understood that this example is illustrative, and therefore should not be construed as being limiting in any way. A user or other authorized entity associated with the gateway device can communicate with the gateway device via a local network such as a WiFi connection, a BLUETOOTH connection, and/or other data communication technologies (e.g., a direct wireless or wired connection, a web-enabled access portal, combinations thereof, or the like).

The user device can communicate with a network access management application hosted and/or executed by the gateway device to manage network access for a guest user device that may be scheduled to be in the geographic location at some defined time period (e.g., for a hotel reservation, a home rental, an office rental, or the like). The user device can request that the gateway device provide network access to the guest user device. The user device and/or other entities can define various parameters associated with the network access including, at least, dates and times on those dates during which the network access is to be allowed.

Other parameters can be defined to define what users can or cannot use the network access; what devices can or cannot use the network access; what sites, resources, and/or geographic locations can be accessed via the network access; and the like, any and/or all of which can be used to create limits associated with the network access. The network access management application can create credentials for the guest user device in some embodiments, or can send a management request (with the various parameters and/or limits) to a network access management service, which can be configured to create credentials for use in obtaining the network access. The network access management service can provide copies of the credentials to the gateway device, one or more guest user device(s), and/or other entities. It should be understood that this example is illustrative, and therefore should not be construed as being limiting in any way.

The guest user device can enter the geographic location (e.g., communication range of the gateway device) and can login to the gateway device using the credentials. The network access management application can be configured to apply the limits to the access obtained using the credentials and to determine, at various times and/or substantially continuously, if the access is occurring in compliance with the limits set by the owner or other entity (e.g., the dates and times associated with the credentials, the date use limits, or the like). If the network access management application determines that the dates and times set for the credentials are not met at any point in time, the network access management application can terminate the access and/or revoke the credentials, thereby preventing the guest user device from using the gateway device using the credentials. Other limits also can be enforced by the network access management application and/or other entities, but access may not be revoked in some embodiments for anything other than exceeding the time and date limits. In some embodiments, if the credentials are revoked and/or access is terminated at any time, the network access management application may send an update to the network access management service to update the credentials and/or other information stored at the server computer. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for network access management will be described, according to an illustrative embodiment. The operating environment 100 shown in FIG. 1 includes a server computer 102. The server computer 102 can operate in communication with and/or as a part of a communications network ("network") 104, though this is not necessarily the case in all embodiments.

According to various embodiments, the functionality of the server computer 102 may be provided by one or more application servers, web servers, server computers, other computing systems, and the like. It should be understood that the functionality of the server computer 102 may be provided by a single device, by two or more similar devices, and/or by two or more dissimilar devices. For purposes of describing the concepts and technologies disclosed herein, the server computer 102 is described herein as a server computer. It should be understood that this embodiment is illustrative, and should not be construed as being limiting in any way.

The server computer 102 can execute an operating system 106 and one or more application programs such as, for example, a network access management service 108. The operating system 106 can include a computer program that can control the operation of the server computer 102. The network access management service 108 can include an executable program that can be configured to execute on top of the operating system 106 to provide various functions as illustrated and described herein. Before disclosing the functionality of the network access management service 108, however, additional aspects and/or components of the illustrated operating environment 100 will be disclosed.

As shown in FIG. 1, the operating environment 100 also can include a gateway device 110. The gateway device 110 can be configured to operate in communication with and/or as a part of the network 104, though this is not necessarily the case in all embodiments. In some embodiments, the gateway device 110 can correspond to a customer premises equipment associated with the network 104 and therefore can be owned and/or controlled by an authorized entity associated with the network 104. It should be understood that this example is illustrative, and therefore should not be construed as being limiting in any way.

According to various embodiments, the functionality of the gateway device 110 may be provided by one or more instances of customer premises equipment, one or more gateways and/or gateway devices, one or more wireless hotspot devices, one or more other computing systems, and the like. It should be understood that the functionality of the gateway device 110 may be provided by a single device, by two or more similar devices, and/or by two or more dissimilar devices. For purposes of describing the concepts and technologies disclosed herein, the gateway device 110 is described herein as a home gateway. It should be understood that this embodiment is illustrative, and therefore should not be construed as being limiting in any way.

According to various embodiments of the concepts and technologies disclosed herein, the gateway device 110 can execute an operating system or firmware (hereinafter "firmware")(not labeled in FIG. 1) and one or more application programs such as, for example, a network access management application 112. The firmware can include one or more software components and/or computer programs that can control the operation of the gateway device 110. The network access management application 112 can include an executable program that can be configured to execute on top of and/or independently from the firmware to provide various functions as illustrated and described herein for enabling, configuring, and/or managing network access.

In particular, the network access management application 112 can be configured to manage Internet connectivity (e.g., wireless Internet access) for users in proximity to (e.g., within a communication distance or range of) the gateway device 110. For example, the gateway device 110 may be located at a residence or office or other geographic location 114 and can be configured to manage Internet connectivity for devices located at or near the residence or office (e.g., close enough to the gateway device 110 that communications can occur via the gateway device 110). It should be understood that this example is illustrative, and therefore should not be construed as being limiting in any way.

In various embodiments of the concepts and technologies disclosed herein, the gateway device 110 can include a wireless router (e.g., a WiFi router, or the like), and the network access management application 112 can be configured to manage connections between devices and the wireless router. For example, the network access management application 112 can manage a connection (e.g., a WiFi connection) between the gateway device 110 and a user device 116. According to various embodiments of the concepts and technologies disclosed herein, the user device 116 can correspond to a mobile phone, smartphone, tablet device, computer, or the like associated with an owner, user, or other entity associated with the gateway device 110. For example, an owner of a residence may interact with the gateway device 110 via interactions between the user device 116 and the network access management application 112 hosted by the gateway device 110. These interactions can occur via a local network 118, which can be established and/or managed by the network access management application 112 in some embodiments. Thus, it can be appreciated that the local network 118 can correspond to a wireless network (e.g., a WiFi network), a wireless connection between two or more devices (e.g., a WiFi connection, a BLUETOOTH connection, etc.), other types of connections or networks, or the like. It should be understood that this example is illustrative, and therefore should not be construed as being limiting in any way.

In one contemplated embodiment, the owner or other entity associated with the gateway device 110 and the geographic location 114 (e.g., an owner or authorized entity associated with an office at which the gateway device 110 is located, an owner of a residence at which the gateway device 110 is located, a landlord or other entity associated with a rental location at which the gateway device 110 is located, or the like) may wish to enable access for a guest user device 120 of a guest who plans to be located at the geographic location 114 at some time in the future (e.g., the guest and his or her associated guest user device 120 may be located outside the geographic location 114 at a first time $t_1$ and may enter into or be located within the geographic location 114 at a second time $t_2$). In one contemplated embodiment, the guest user device 120 can be associated with a renter who has rented a premises located at the geographic location 114, and the landlord or owner may wish to grant network access to the guest user device 120 during the rental. It should be understood that this example is illustrative, and therefore should not be construed as being limiting in any way.

According to various embodiments of the concepts and technologies disclosed herein, the owner or other authorized entity associated with the geographic location 114 and the local network 118 can interact with the network access management service 108 and/or the network access management application 112 (e.g., via a user device 116) to grant access to the local network 118, where the access can be temporally limited and/or limited in other manners as will be illustrated and described herein. In some embodiments, the network access management application 112 can be configured to generate a management request 122 in response to the interactions of the owner or other authorized entity with the network access management application 112, and the network access management service 108 can be configured to grant and/or control the access. In some other embodiments, the network access management application 112 can be configured to grant and/or control the access of devices at the geographic location 114. Regardless of how the access is controlled by the network access management service 108 and/or the network access management application 112, embodiments of the concepts and technologies disclosed herein can be used to provide limited access at the geographic location 114.

In particular, according to various embodiments of the concepts and technologies disclosed herein, network access granted to the guest user device 120 at the geographic location 114 can be limited in time (e.g., limited to certain dates and/or times, limited in duration, or the like). For example, the access granted to the guest user device 120 while located at the geographic location 114 can be limited to dates and times that correspond to a rental of a premises associated with the geographic location 114 in some embodiments. Thus, for example, if a reservation or rental is scheduled to begin at a first time on a first date and end at a second time on a second date, the access granted to the guest user device 120 at the geographic location 114 can begin (e.g., can be enabled) at the first time on the first date and can end (e.g., can be disabled, terminated, revoked, or the like) at the second time on the second date. It should be understood that this example is illustrative, and therefore should not be construed as being limiting in any way.

According to various embodiments of the concepts and technologies disclosed herein, temporal limiting of the granted network access can be accomplished by the network access management service 108 and/or the network access management application 112 being configured to generate credentials 124 for the guest user device 120, where the credentials 124 can be made valid during a desired timeframe (and invalid at times or dates outside of the desired timeframe). It should be understood that this example is illustrative, and therefore should not be construed as being limiting in any way.

According to some embodiments of the concepts and technologies disclosed herein, the network access granted to the guest user device 120 while located at the geographic location 114 can also be limited in other ways. For example, the network access can be limited in terms of data usage. In some instances, for example, the network access granted to the guest user device 120 while located at the geographic location 114 can be limited to a certain amount of data during the duration of the authorized time period. Additionally, or alternatively, the access granted to the guest user device 120 while located at the geographic location 114 can be limited to a certain rate of data consumption (e.g., a certain amount of data during a defined time period such as bytes per second, kilobytes per minute, Megabytes per hour, or the like). According to various embodiments of the concepts and technologies disclosed herein, this can be accomplished by the network access management service 108 and/or the network access management application 112 being configured to generate credentials 124 for the guest user device 120, where the credentials 124 can be made valid for a certain amount of data and/or to support a certain rate of data consumption and/or made invalid if the defined data usage limits are exceeded. It should be understood that this example is illustrative, and therefore should not be construed as being limiting in any way.

According to some embodiments of the concepts and technologies disclosed herein, the network access granted to the guest user device 120 while located at the geographic location 114 can also be limited in terms of content. For example, the access granted to the guest user device 120 while located at the geographic location 114 can be limited for access to certain locations or resources (e.g., sites or locations listed on a permitted site list), restricted from accessing certain locations or resources (e.g., sites or locations listed on a forbidden site list), limited to accessing sites or resources in specified geographic locations, combinations thereof, or the like. According to various embodiments of the concepts and technologies disclosed herein, this can be accomplished by the network access management service 108 and/or the network access management application 112 being configured to generate credentials 124 for the guest user device 120, where the credentials 124 can be made valid for a specified sites, specific locations, specified geographic locations, combinations thereof, or the like; and invalid if used to access specified sites, specific locations, specified geographic locations, combinations thereof, or the like. It should be understood that this example is illustrative, and therefore should not be construed as being limiting in any way.

According to various embodiments of the concepts and technologies disclosed herein, the network access management service 108 and/or the network access management application 112 can be configured to generate the credentials 124 for the guest user device 120. The credentials 124 can specify, for the network access being granted, a user ID, a password, and one or more limits. The limits can include at least date limits and time limits, but also can include duration limits, data limits, data usage rate limits, location limits, site limits, combinations thereof, or the like. If the credentials 124 are generated at the network access management application 112, the network access management application 112 can be configured to provide the credentials 124 to the network access management service 108, and the network access management service 108 can be configured to store a copy of the credentials 124 at the server computer 102 and to provide a copy of the credentials 124 to the guest user device 120 for use when the guest user device 120 arrives within the geographic location 114.

If the credentials 124 are generated at the network access management service 108, the network access management service 108 can be configured to provide the credentials 124 to the network access management application 112 and/or the gateway device 110. The network access management service 108 also can be configured to provide a copy of the credentials 124 to the guest user device 120 for use when the guest user device 120 arrives within the geographic location 114. Thus, it can be appreciated that the credentials 124 generated at the network access management service 108 and/or the network access management application 112 can be obtained and/or stored by the server computer 102, the gateway device 110, and one or more guest user device(s) 120. It should be understood that this example is illustrative, and therefore should not be construed as being limiting in any way.

As such, the network access management application 112 can be configured to receive, e.g., from the user device 116 associated with an owner or other authorized entity, a guest access request that can request network access for a guest user device 120. The network access management application 112 can be configured to confirm the guest access (e.g., via interactions with the user device 116) and to determine connection parameters for the guest access. The connection parameters can define, for example, the date and/or time restrictions for the network access; data usage restrictions for the network access; data rate restrictions for the network access; permissible and/or impermissible sites for the network access; permissible and/or impermissible geographic locations for the network access; combinations thereof, or the like. The network access management application 112 can be configured to generate the credentials 124 in some embodiments, or to send a management request 122 to the network access management service 108 to enable the network access management service 108 to generate the credentials 124. The management request 122 can include the connection parameters and therefore can include and/or can specify the date and time information, the date and time information, the user information, the time information, data limits, and/or other information. It should be understood that this example is illustrative, and therefore should not be construed as being limiting in any way.

As can be appreciated from the description herein, the date and time information can include data or information that defines dates for which the network access should be granted and times of day on the dates for which the network access should be granted. Thus, for example, the date and time information may specify that network access should be allowed from a first time on a first date until a second time on a second date. It should be understood that this example is illustrative, and therefore should not be construed as being limiting in any way.

The user information of the management request 122 can include information that can identify the user associated with the network access being granted. Thus, the user information can include a login, an email address, a phone number, a reservation code, a confirmation number, and/or other unique identifier that can be used by the guest to access the local network 118. In some embodiments, the user information can be used as the user ID, though this is not necessarily the case in all embodiments. The time information can include information that can identify and/or specify any temporal limits on the network access including, but not limited to, time durations for which network access should be granted; total connection time for which the network access should be granted; or the like.

The data limits can include, for example, limits on amounts of data that can be transmitted using the network access being granted; data rate limits for the network access (for the associated user); permissible and/or impermissible geographic locations, sites, resources, or the like; and/or other limits on the types of information that can be received and/or transmitted via the network access and/or locations to and/or from which data can or cannot be received and/or transmitted via the network access. The other information can include other information that can be used to limit any aspects of the network access (e.g., device identifiers, etc.). It should be understood that these examples are illustrative, and therefore should not be construed as being limiting in any way.

In some embodiments, as noted above, the network access management application 112 can be configured to send the management request 122 to the network access management service 108, and the network access management service 108 can be configured to generate the credentials 124 for the guest access. The network access management service 108 can be configured to send a copy of the credentials 124 to the guest user device 120 and the gateway device 110, in some embodiments. The network access management service 108 can be configured to send, to the network access management application 112, the credentials 124 with data that can define the limits on the network access, in some embodiments. In some other embodiments, because the network access management application 112 can be used to define the limits (e.g., communicated to the network access management service 108 with the management request 122), the network access management application 112 may not need to receive any data defining the limits and may already have that information stored. As such, the credentials 124 are illustrated in FIG. 1 as including the user ID, password, and limits; but in some embodiments the credentials may only include the user ID and password and the network access management application 112 can be configured to apply the limits to the network access, but not all of this information must be included in all embodiments. As such, it should be understood that the illustrated example is illustrative, and therefore should not be construed as being limiting in any way.

The network access management application 112 also can be configured to apply the limits to the network access granted to the guest user device 120. Thus, the network access management application 112 can be configured to detect a guest login (e.g., by detecting a connection to and/or login with the gateway device 110 using the credentials 124). If the credentials 124 are valid (e.g., if the login ID and password match; and if the date and/or time limits associated with the credentials 124 are met), the network access management application 112 can enable the requested access. The limits associated with the guest access obtained using the credentials 124 can be applied by the network access management application 112. Thus, for example, data transmissions via the gateway device 110 can be monitored for compliance with data limits; compliance with data consumption rate limits; compliance with permissible and/or impermissible site, resource, and/or location access limits; compliance with other limits; and the like.

The network access management application 112 can also be configured to determine when the date and time limits for the access are met, are no longer met, are complied with, are not complied with, are not exceeded, are exceeded, or the like. As explained above, the date and time limits can specify exactly when the credentials 124 will be valid for enabling the access altogether, while the other limits illustrated and described herein can be applied to limit traffic associated with the access (when accessed during validity of the credentials 124). Thus, the date and time limits can be applied separately, in various embodiments of the concepts and technologies disclosed herein. In some embodiments of the concepts and technologies disclosed herein, the date and time limits may be the only limits applied to the access. It should be understood that this example is illustrative, and therefore should not be construed as being limiting in any way.

The network access management application 112 can determine if the access complies with the date and time limits. As long as the date and time limits are complied with, the network access management application 112 can continue to allow and/or enable the access and/or apply limits to the access (if applicable). If the network access management application 112 determines that the access does not comply with the date and time limits, the network access management application 112 can be configured to terminate the access (e.g., the active session) and/or to revoke the access. Thus, it can be appreciated that the credentials 124 can be invalid after the date and time limits are exceeded. The network access management application 112 can also be configured to send an update 126 to the network access management service 108. The update 126 can inform the network access management service 108 that the credentials 124 have expired, have been revoked, and/or are no longer valid. The update 126 may not be included in all embodiments (e.g., the network access management service 108 may know the limits and may know when the credentials 124 are no longer valid without the update 126), so the illustrated embodiment is illustrative and should not be construed as being limiting in any way.

In practice, a gateway device 110 can be located at and associated with a geographic location 114 such as, for example, a residence, an office, a store, a hotel, or the like. In some embodiments, the geographic location 114 can be defined as the communication range and/or communication limits of the gateway device 110. Thus, for example, a device may be considered to be "at the geographic location 114" if the device is within a communication range of the gateway device 110. It should be understood that this example is illustrative, and therefore should not be construed as being limiting in any way. A user or other authorized entity associated with the gateway device 110 can communicate with the gateway device 110 using a user device 116, which may communicate with the gateway device 110 via a local network 118 such as a WiFi connection, a BLUETOOTH connection, and/or other data communication technologies (e.g., a direct wireless or wired connection, a web-enabled access portal, combinations thereof, or the like).

The user device 116 can communicate with a network access management application 112 hosted and/or executed by the gateway device 110 to manage network access for one or more guest user device 120 that may be scheduled to be in the geographic location 114 at some defined time period (e.g., for a hotel reservation, a home rental, an office rental, or the like). The user device 116 can request that the gateway device 110 provide network access to the guest user device 120. The user device 116 and/or other entities can define various parameters associated with the network access including, at least, dates and times on those dates during which the network access is to be allowed. Other parameters can be defined to define what users can or cannot use the network access; what devices can or cannot use the network access; what sites, resources, and/or geographic locations can be accessed via the network access; and the like, all of which can be used to create limits associated with the network access, if desired.

The network access management application 112 can create credentials 124 for the guest user device 120 in some embodiments, or can send a management request 122 (with the various parameters and/or limits) to a network access management service 108, which can create the credentials 124 for use in obtaining the network access. In yet other embodiments, a server or device such as the server computer 102 that hosts the network access management service 108 can expose an API via which the network access management application 112 can request creation of the credentials 124 in various embodiments. The network access management service 108 can provide copies of the credentials 124 to the gateway device 110, one or more guest user device 120, and/or other entities. It should be understood that this example is illustrative, and therefore should not be construed as being limiting in any way.

The guest user device 120 can enter the geographic location 114 (e.g., enter into communication range and/or communication limits of the gateway device 110) and can login to the gateway device 110 using the credentials. The network access management application 112 can be configured to apply the limits to the access obtained using the credentials 124 and to determine, at various times and/or substantially continuously, if the access is occurring in compliance with the dates and times associated with the credentials 124. If the network access management application 112 determines that the dates and times set for the credentials are not met at any point in time, the network access management application 112 can terminate the access and/or revoke the credentials 124, thereby preventing the guest user device 120 from using the gateway device 110 using the credentials 124. The network access management application 112 can be configured to send an update 126 to the network access management service 108 to update the credentials 124 and/or other information stored at the server computer 102 in some embodiments. It should be understood that this example is illustrative, and therefore should not be construed as being limiting in any way.

FIG. 1 illustrates one server computer 102, one network 104, one gateway device 110, one geographic location 114, one user device 116, one local network 118, and one guest user device 120. It should be understood, however, that various implementations of the operating environment 100 can include one or more than one server computer 102; one or more than one network 104; one or more than one gateway device 110; one or more than one geographic location 114; zero, one, or more than one user device 116; one or more than one local network 118; and one or more than one guest user device 120. As such, the illustrated embodiment should be understood as being illustrative, and should not be construed as being limiting in any way.

Figure 2:
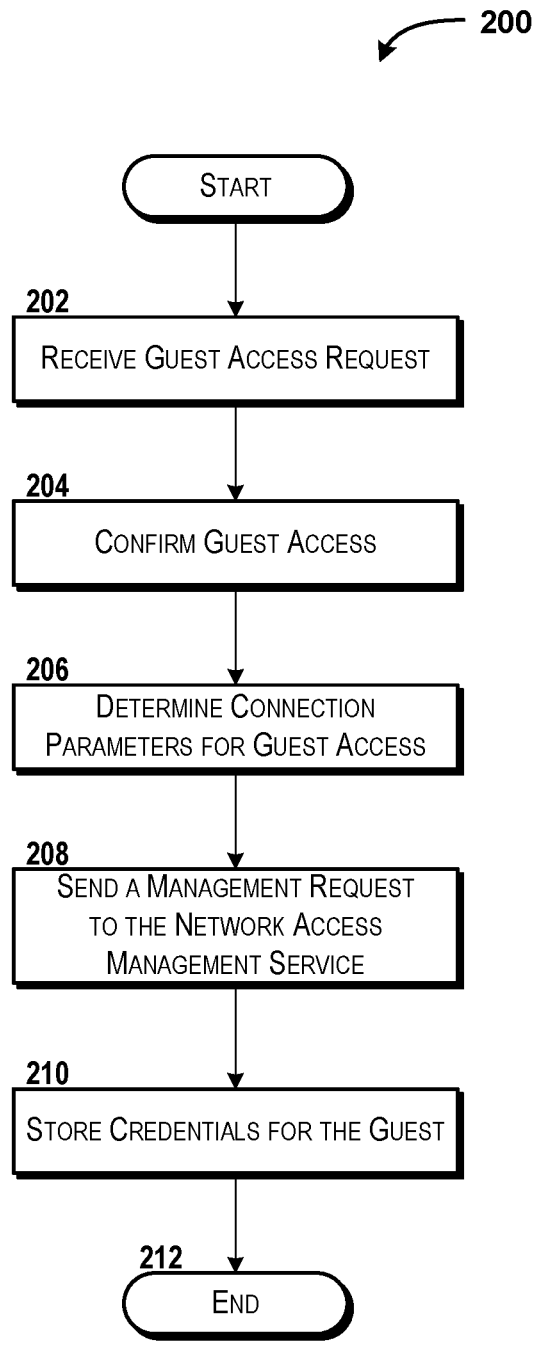
FIG. 2 is a flow diagram showing aspects of a method for creating credentials for a guest user device, according to an illustrative embodiment of the concepts and technologies described herein.

Turning now to FIG. 2, aspects of a method 200 for creating credentials 124 for a guest user device 120 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 and/or the gateway device 110, to perform one or more operations and/or causing the processor to direct other components of the computing system or device to perform one or more of the operations.

For purposes of illustrating and describing the concepts of the present disclosure, the method 200 is described herein as being performed by the gateway device 110 via execution of one or more software modules such as, for example, the network access management application 112. It should be understood that additional and/or alternative devices and/or network nodes can provide the functionality described herein via execution of one or more modules, applications, and/or other software including, but not limited to, the network access management application 112. Thus, the illustrated embodiments are illustrative, and should not be viewed as being limiting in any way.

The method 200 can begin at operation 202. At operation 202, the gateway device 110 can receive a guest access request, e.g., a request to enable network access for a guest device such as a guest user device 120. According to various embodiments of the concepts and technologies disclosed herein, the "request" received in operation 202 can correspond to a command created by a user device 116 via an application, portal, or the like, and therefore may not correspond to "request" per se (and therefore is not illustrated in FIG. 1). The request for guest access also can come from other devices or entities (e.g., the request or command can be generated by a vacation rental site such as the AIRBNB site, which can generate a request for a customer to obtain guest access when staying at a rental associated with the geographic location 114 and the gateway device 110; from a guest user device 120, which may request the access from the geographic location 114 and/or elsewhere; or the like). Because the gateway device 110 can determine that network access has been requested, ordered, or the like in additional and/or alternative manners, it should be understood that these examples are illustrative, and therefore should not be construed as being limiting in any way.

From operation 202, the method 200 can proceed to operation 204. At operation 204, the gateway device 110 can confirm the guest access request received in operation 202. According to various embodiments of the concepts and technologies disclosed herein, the gateway device 110 can communicate with a user or other entity (e.g., via interactions with the user device 116 and/or other entities) to confirm that the guest access should be granted, if desired. In some other embodiments, the guest access may be granted in certain circumstances without confirming each request with the user device 116 and/or other devices. Thus, operation 204 can correspond to the gateway device 110 determining that the requested access is legitimate and/or allowed. In some embodiments, the gateway device 110 can push a notification to the user device 116 and the user device 116 can login to approve or deny the request. Because additional and/or alternative manners of approving or denying network access requests are possible and are contemplated, it should be understood that these example embodiments are illustrative, and therefore should not be construed as being limiting in any way.

From operation 204, the method 200 can proceed to operation 206. At operation 206, the gateway device 110 can determine connection parameters for the guest access requested by way of the guest access request received in operation 202. Thus, operation 206 can correspond to the gateway device 110 determining (e.g., via interactions with the user device 116), date and time limits for the network access; time limits for the network access (e.g., time duration limits for the network access, etc.); data limits for the network access (e.g., amounts of data, data rates, types of data, and/or the like that will or will not be allowed); location limits (e.g., sites, resources, and/or geographic locations that are or are not allowed for the network access), combinations thereof, or the like. In some embodiments of the concepts and technologies disclosed herein, the connection parameters can be obtained via one or more portals, user interfaces, or other functionality that can be accessed by and/or presented at the user device 116. It should be understood that this example is illustrative, and therefore should not be construed as being limiting in any way.

From operation 206, the method 200 can proceed to operation 208. At operation 208, the gateway device 110 can send a management request 122 to the network access management service 108. The management request 122 can include data describing various limits (e.g., the connection parameters illustrated and described herein) and can request creation of credentials 124 for the guest user. As explained herein, the network access management application 112 can be configured in some embodiments to generate the credentials 124, so this embodiment is illustrative and should not be construed as being limiting in any way.

From operation 208, the method 200 can proceed to operation 210. At operation 210, the gateway device 110 can store credentials 124 for the guest access. According to some embodiments, the credentials 124 can include (or can be associated by the gateway device 110 with) limits for the guest access. The credentials 124 can be received by the gateway device 110; created by the network access management application 112 executed by the gateway device 110; and/or otherwise obtained by the network access management application 112. The gateway device 110 can know, for example based on various different data files, the various limits that are to apply to the network access including, but not limited to, date and time limits for the network access; time limits such as duration limits for the network access; data limits such as data caps, data rate caps, and/or other limits on the amount of data and/or rate of data transmissions; permissible and/or impermissible sites, resources, geographic locations, or the like; and/or other limits. Thus, the credentials 124 can be used to enable network access and also to limit the network access in various embodiments. It should be understood that this example is illustrative, and therefore should not be construed as being limiting in any way.

From operation 210, the method 200 can proceed to operation 212. The method 200 can end at operation 212.

Figure 3:
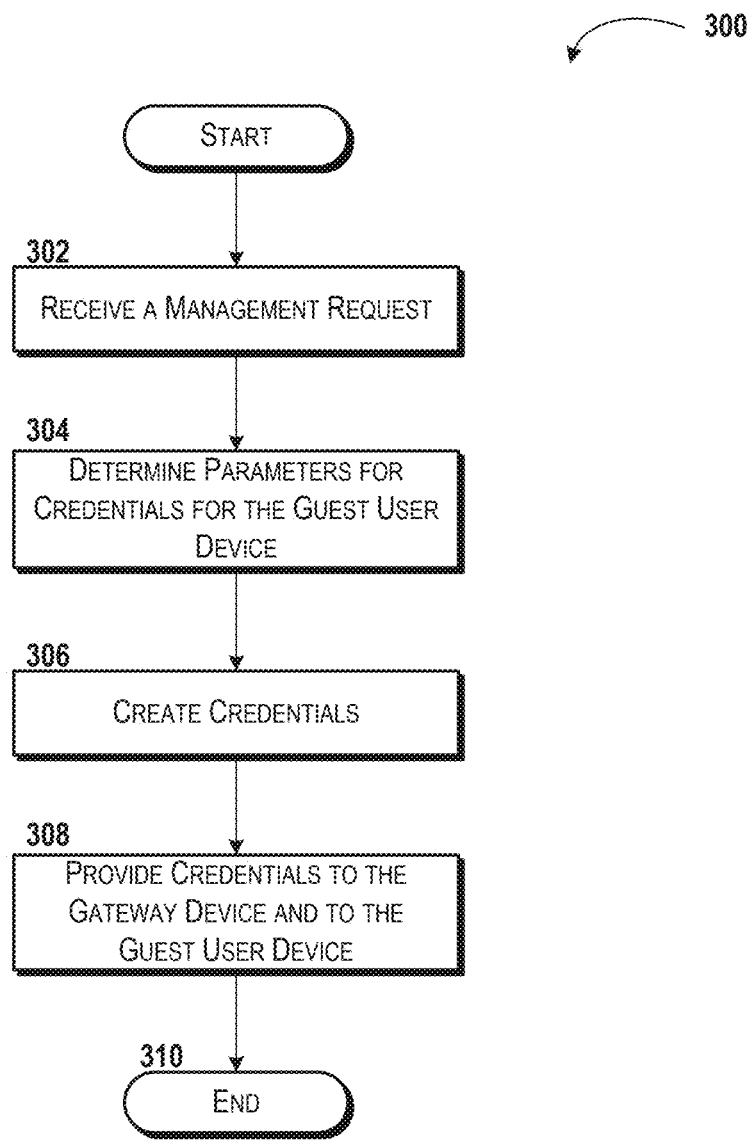
FIG. 3 is a flow diagram showing aspects of a method for creating credentials using a network access management service, according to an illustrative embodiment of the concepts and technologies described herein.

Turning now to FIG. 3, aspects of a method 300 for creating credentials 124 using a network access management service 108 will be described in detail, according to an illustrative embodiment. For purposes of illustrating and describing the concepts of the present disclosure, the method 300 is described herein as being performed by the server computer 102 via execution of one or more software modules such as, for example, the network access management service 108. It should be understood that additional and/or alternative devices and/or network nodes can provide the functionality described herein via execution of one or more modules, applications, and/or other software including, but not limited to, the network access management service 108. Thus, the illustrated embodiments are illustrative, and should not be viewed as being limiting in any way.

The method 300 can begin at operation 302. At operation 302, the server computer 102 can receive a management request 122. In some embodiments, the management request 122 can be received from a registered device or entity, for example, the gateway device 110, the user device 116, or the like. As explained above, the management request 122 can include the date and time information, the user information, the time information, data limits, and/or other information. Thus, the management request 122 can request creation of the credentials 124 and can specify the connection parameters and/or limits that are to be applied to the access being enabled by the credentials 124. Because the limits on the access may be known and may be applied by the network access management application 112 without including limits in the credentials 124, it should be understood that this example is illustrative, and therefore should not be construed as being limiting in any way.

From operation 302, the method 300 can proceed to operation 304. At operation 304, the server computer 102 can determine parameters for the credentials 124 for the guest user device 120. Thus, the server computer 102 can determine dates for which the network access should be granted and times of day during those dates for which the network access should be granted. The server computer 102 also can be configured to determine one or more identities of users or other entities associated with the network access being granted and/or temporal limits on the network access such as time durations for which network access should be granted, total connection time for which the network access should be granted, or the like. The server computer 102 also can be configured to determine limits on amounts of data that can be transmitted using the network access being granted, data rate limits for the network access, permissible and/or impermissible geographic locations, sites, resources, or the like, and/or other limits on the types of information that can be received and/or transmitted via the network access and/or locations to and/or from which data can or cannot be received and/or transmitted via the network access. It should be understood that these examples are illustrative, and therefore should not be construed as being limiting in any way.

From operation 304, the method 300 can proceed to operation 306. At operation 306, the server computer 102 can create the credentials 124. The credentials 124 can include a user ID and password, according to various embodiments. In some embodiments, the credentials 124 can also include data defining limits associated with the network access that is to be obtained using the credentials 124. Because the gateway device 110 may apply the limits on the network access (without those limits being included in the credentials 124), it should be understood that this embodiment is illustrative and should not be construed as being limiting in any way.

From operation 306, the method 300 can proceed to operation 308. At operation 308, the server computer 102 can provide the credentials 124 created in operation 306 to the gateway device 110 and to one or more guest user device 120 (or a user associated with the guest user device 120, e.g., via an email, text message, or the like). Thus, the gateway device 110 can be configured to obtain the credentials 124 from the network access management service 108 without having to create the credentials 124, in some embodiments. The guest user device 120 also can be configured to obtain the credentials 124 so that the guest user device 120 can connect to the local network 118 when the guest user device 120 is at the geographic location 114. It should be understood that this example is illustrative, and therefore should not be construed as being limiting in any way.

From operation 308, the method 300 can proceed to operation 310. The method 300 can end at operation 310.

Figure 4:
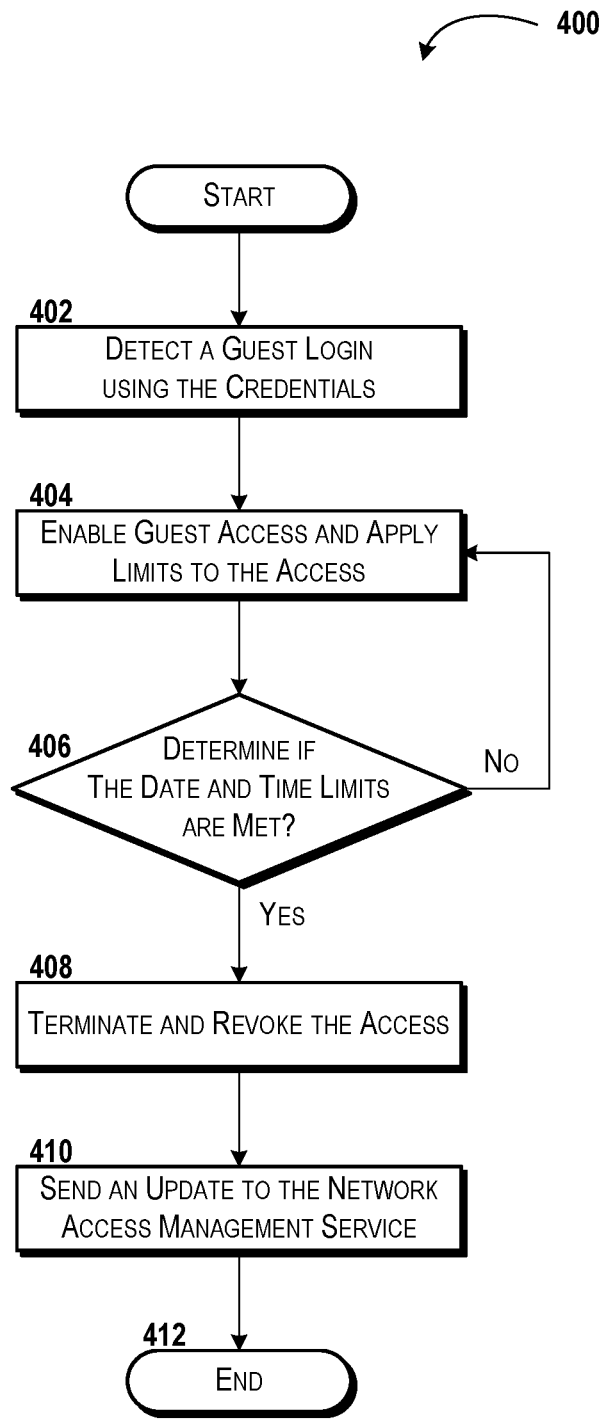
FIG. 4 is a flow diagram showing aspects of a method for managing temporary network access, according to an illustrative embodiment of the concepts and technologies described herein.

Turning now to FIG. 4, aspects of a method 400 for managing temporary network access will be described in detail, according to an illustrative embodiment. For purposes of illustrating and describing the concepts of the present disclosure, the method 400 is described herein as being performed by the gateway device 110 via execution of one or more software modules such as, for example, the network access management application 112. It should be understood that additional and/or alternative devices and/or network nodes can provide the functionality described herein via execution of one or more modules, applications, and/or other software including, but not limited to, the network access management application 112. Thus, the illustrated embodiments are illustrative, and should not be viewed as being limiting in any way.

The method 400 begins at operation 402. At operation 402, the gateway device 110 can detect a guest login using the credentials 124. Because the network access management application 112 can store the credentials 124 (or a copy of the credentials 124 with the associated limits on the network access to be granted to the device using the credentials 124), the gateway device 110 can be configured to determine limits associated with network access based on the credentials 124 in some embodiments. It should be understood that this example is illustrative, and therefore should not be construed as being limiting in any way.

From operation 402, the method 400 can proceed to operation 404. At operation 404, the gateway device 110 can enable the guest access and apply the limits to the enabled guest access. Thus, it can be appreciated that the gateway device 110 can determine the limits associated with the access obtained using the credentials 124 and apply these limits to the network access. As such, the gateway device 110 can apply, in operation 404, time limits such as duration limits for the network access; data limits such as data caps, data rate caps, and/or other limits on the amount of data and/or rate of data transmissions; permissible and/or impermissible sites, resources, geographic locations, or the like; and/or other limits. Because additional limits are illustrated and described herein, it should be understood that additional limits can be applied in operation 404. Furthermore, because the above examples are illustrative of some embodiments that may or may not be applied, these examples should not be construed as being limiting in any way.

From operation 404, the method 400 can proceed to operation 406. At operation 406, the gateway device 110 can determine if the date and time limits associated with the credentials 124 have been satisfied, have not been satisfied, have been met, have not been met, are being complied with, are not being complied with, or the like. Thus, the gateway device 110 can determine, in operation 406, when the credentials 124 are valid or invalid. For example, the gateway device 110 can determine, e.g., an effective-from date and time, an effective-to date and time, and a time range for which the credentials 124 are valid, the time range beginning at the effective-from date and time and extending until the effective-to date and time. It should be understood that this example is illustrative, and therefore should not be construed as being limiting in any way.

In some embodiments of the concepts and technologies disclosed herein, as noted above, the date and time limits for the credentials 124 may be the only limits applied by the gateway device 110, though in the illustrated embodiment other limits such as those illustrated and described with reference to operation 404 can be included as well. In any event, operation 406 can correspond to the gateway device 110 determining if the credentials 124 are still within their date and time limits of validity and/or are outside their date and time limits of validity.

If the gateway device 110 determines, in operation 406, that the date and time limits associated with the credentials 124 are met, satisfied, or the like (e.g., that the access occurring is occurring at a date and time at which the credentials 124 are valid), the method 400 can return to operation 404 and the gateway device 110 can continue to enable the access and continue to apply the limits to the access enabled by the credentials 124 (if such limits exist). Thus, it can be appreciated that operation 406 can be iterated any number of times until the gateway device 110 determines, in any iteration of operation 406, that the date and time limits associated with the credentials 124 are no longer met, satisfied, or the like. It should be understood that this example is illustrative, and therefore should not be construed as being limiting in any way.

If the gateway device 110 determines, in any iteration of operation 406, that the date and time limits associated with the credentials 124 are no longer met, satisfied, or the like; the method 400 can proceed to operation 408. At operation 408, the gateway device 110 can terminate and/or revoke the access associated with the credentials 124 and/or revoke the credentials 124. Thus, operation 408 can correspond to the gateway device 110 determining that the date and time range for the credentials has passed or the like, and terminate the network access that was granted. Because additional and/or alternative manners exist for ending access when the credentials 124 are no longer valid, it should be understood that these examples are illustrative, and therefore should not be construed as being limiting in any way.

From operation 408, the method 400 can proceed to operation 410. At operation 410, the gateway device 110 can send an update 126 to the network access management service 108. The update 126 can inform the network access management service 108 that the credentials 124 are no longer valid and/or that that the network access granted to the guest user device 120 has been revoked. As such, it can be appreciated that embodiments of the concepts and technologies disclosed herein can limit access for a guest user device 120 to specified dates and/or times. It should be understood that this example is illustrative, and therefore should not be construed as being limiting in any way.

From operation 410, the method 400 can proceed to operation 412. The method 400 can end at operation 412.

While FIGS. 1-4 have illustrated and described a single guest user device 120, it should be understood that the concepts and technologies disclosed herein can be used to provide credentials 124 to more than one guest user device 120. In particular, it can be appreciated that a guest may have more than one device that he or she wishes to use at the geographic location 114. Thus, some embodiments of the concepts and technologies disclosed herein can support issuing credentials 124 (or copies of credentials 124) to multiple guest user devices 120. Thus, for example, a guest may share credentials 124 across multiple devices to enable access when at the geographic location 114, or the network access management service 108 can be configured to issue the credentials 124 to the multiple guest user devices 120, issue multiple instances of credentials 124 to the multiple guest user devices 120 (the multiple instances of credentials 124 can be the same as one another and/or may differ from one another), and/or other manners of enabling access for multiple guest user devices 120 may be possible. Thus, it should be understood that these examples are illustrative, and therefore should not be construed as being limiting in any way. Furthermore, it can be appreciated that the management request 122 can include identifying information for the user, for one or more devices (e.g., one or more guest user devices 120), or the like. Also, it can be appreciated that the credentials 124 may include identifying information for one or more guest user devices 120 in some embodiments. It should be understood that this example is illustrative, and therefore should not be construed as being limiting in any way.

While the above disclosure has discussed embodiments wherein the credentials 124 can include a userID, password, and/or other information, it should be understood that in some embodiments of the concepts and technologies disclosed herein, the credentials 124 can include a custom and/or temporary SSID for the gateway device 110 and/or the wireless networking hardware associated with the gateway device 110. Thus, a guest user device 120 may connect to the gateway device 110 using a temporally limited and/or custom SSID in addition to, and/or instead of, using a login and password as illustrated and described herein. It should be understood that this example is illustrative, and therefore should not be construed as being limiting in any way.

Figure 5:
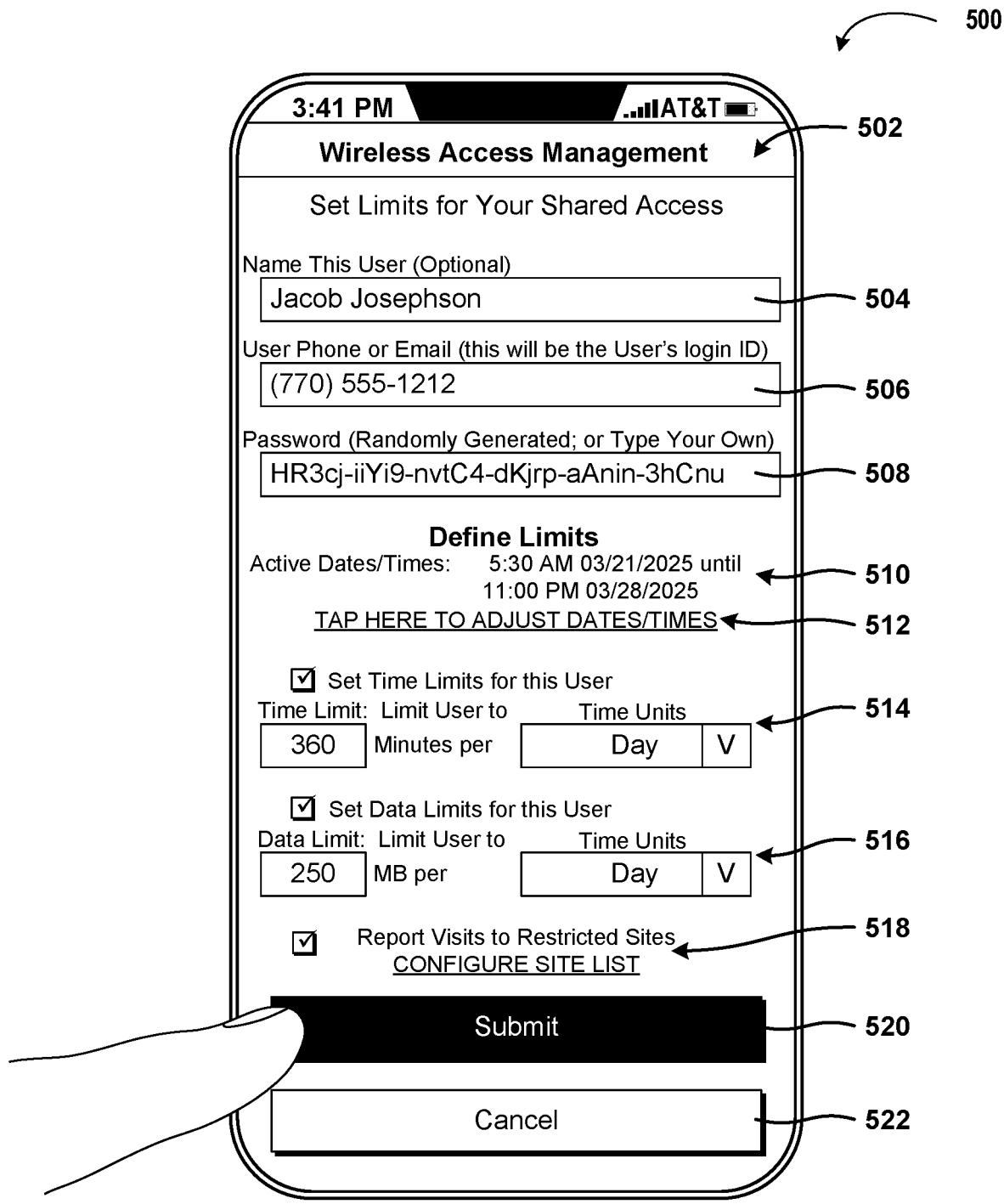
FIG. 5 is a user interface diagram showing an example screen display for providing network access management, according to an illustrative embodiment of the concepts and technologies described herein.

FIG. 5 is a user interface ("UI") diagram showing aspects of a UI for using and/or interacting with network access management service 108 and/or the network access management application 112, according to some illustrative embodiments. FIG. 5 shows an illustrative screen display 500. According to some embodiments of the concepts and technologies described herein, the screen display 500 can be generated by a device such as the user device 116 via interactions with the network access management application 112 while configuring guest access for a guest user device 120.

In particular, according to various embodiments, the user device 116 can generate the screen display 500 and/or other screen displays in conjunction with and/or based upon a request from a user or entity associated with the guest user device 120 for guest access at a location associated with the gateway device 110. Because the screen display 500 can be displayed at the user device 116 and/or other devices at additional and/or alternative times, it should be understood that these examples are illustrative, and therefore should not be construed as being limiting in any way. Also, it should be appreciated that the UI diagram illustrated in FIG. 5 is illustrative of only one contemplated example of the UIs that can be generated and/or displayed in accordance with the concepts and technologies disclosed herein, and therefore the contents and/or configuration of the screen display 500 should not be construed as being limited in any way.

The screen display 500 can include various menus and/or menu options (not shown in FIG. 5). The screen display 500 also can include a network access management window 502. The network access management window 502 can be configured to enable an entity (e.g., an owner of a premises associated with the gateway device 110 or the like) to enable guest access for a device (e.g., the guest user device 120). The network access management window 502 can include multiple fields, check boxes or other selectable UI elements, dropdown menus, radio buttons, or the like for configuring various parameters associated with guest access as illustrated and described herein. Thus, the network access management window 502 can include a user name field 504. The user name field 504 can be used, for example, to enter a name or nickname for a guest device or user for easier tracking and/or for other reasons. Of course, it can be appreciated that multiple guest user devices 120 can be enabled for access as illustrated and described herein, so multiple device and/or user identifiers may be entered via multiple user name fields 504 and/or other UI elements, in some embodiments. It should be understood that this example is illustrative, and therefore should not be construed as being limiting in any way.

In some embodiments, if a phone number or email address is used as a user login, the name or nickname entered in the user name field 504 can be used to provide a recognizable identifier for the user and/or their device (e.g., the guest user device 120). Because a custom name (e.g., a nickname, or the like) can be used for various reasons, it should be understood that this example is illustrative, and therefore should not be construed as being limiting in any way.

The network access management window 502 also can include a user identifier field 506 that can relate to the access being granted. As shown in the example embodiment illustrated in FIG. 5, the user identifier field 506 can be used to input a phone number associated with the user and/or an email address associated with the user. It should be understood that using an email or phone number as the user identifier (e.g., a user login or the like) is an example embodiment, and that other information can be used for a login (e.g., a reservation code for a home rental, hotel reservation, or the like; a device identifier such as a media access control ("MAC") address, an international mobile subscriber identifier ("IMSI"), an international mobile equipment identifier ("IMEI"), or the like; a custom user login; a token or certificate; or the like). As such, it should be understood that the illustrated user identifier in the user identifier field 506 is illustrative, and therefore should not be construed as being limiting in any way.

The network access management window 502 also can include a password field 508, which can be used to display, enter, and/or modify a password associated with a login (e.g., the user identifier shown in the user identifier field 506). In some embodiments, such as in the illustrated embodiment, the password field 508 can be populated with an automatically generated password. In some embodiments, a user or other entity can change the password shown in the password field 508, generate a new random password, and/or otherwise enter a password in the password field 508. Because the password can be created in additional and/or alternative manners, it should be understood that these examples are illustrative, and therefore should not be construed as being limiting in any way.

The network access management window 502 also can include a date limit display and definition portion 510, which can be used to display and/or to modify date limits being set for credentials 124 being created to enable guest access as illustrated and described herein. Thus, as shown in the example embodiment shown in FIG. 5, the date limit display and definition portion 510 can include a time/date range during which the credentials 124 will be valid such as a date and time on which the credentials 124 will begin to work and a date and time at which the credentials 124 will cease to work and/or when any associated sessions will be terminated and/or access will be revoked. In the example embodiment, the credentials 124 being created have been configured to begin working (e.g., be valid) from 5:30 AM (local time) on Mar. 21, 2025 and to cease being valid (e.g., for the sessions to be terminated and access revoked) at 11:00 PM on Mar. 28, 2025. It should be understood that this example is illustrative, and therefore should not be construed as being limiting in any way.

As can be seen in FIG. 5, the date limit display and definition portion 510 can include a link 512 to a screen for configuring the start and ending date and times. Thus, it can be appreciated that selection of the link 512 can cause the user device 116 to present a screen for obtaining date and time information in various embodiments. Because methodology and/or technology for enabling date and/or time selection is generally understood, this display is not separately illustrated and described herein. At any rate, because the date and time limits can be set and/or changed in additional and/or alternative manners, it should be understood that the illustrated example embodiment is illustrative, and therefore should not be construed as being limiting in any way.

The network access management window 502 also can include a time limit display and definition portion 514, which can be used to display and/or to modify time limits being set for the access being enabled by way of creating the credentials 124 as illustrated and described herein. Thus, as shown in the example embodiment shown in FIG. 5, the time limit display and definition portion 514 can include an amount of time per hour, day, week, month, or the like, during which the credentials 124 will be valid. Thus, the time limit display and definition portion 514 can be used to limit an amount of access enabled by the credentials 124 for a specified time unit. In the illustrated example embodiment, the user has limited the access to six hours per day. It should be understood that this example is merely illustrative and should not be construed as being limiting in any way.

The network access management window 502 also can include a data limit display and definition portion 516, which can be used to display and/or to modify data limits being set for the access being enabled by way of creating the credentials 124 as illustrated and described herein. Thus, as shown in the example embodiment shown in FIG. 5, the data limit display and definition portion 516 can include an amount of data per time unit such as, for example, minute, hour, day, week, month, or the like, for which the credentials 124 will be valid. Thus, the data limit display and definition portion 516 can be used to limit an amount of data that can be transmitted via access enabled by the credentials 124 during a specified time unit. In the illustrated example embodiment, the user has limited the data to two hundred fifty Megabytes ("MB") each day. It should be understood that this example is merely illustrative and should not be construed as being limiting in any way.

The network access management window 502 also can include a site restriction display and definition portion 518, which can be used to enable and/or configure site limits for the access being enabled by way of creating the credentials 124 as illustrated and described herein. Thus, as shown in the example embodiment shown in FIG. 5, the site restriction display and definition portion 518 can be used to exclude (from the access being granted by way of the credentials 124 being created) from the access. Thus, the site restriction display and definition portion 518 can be used to limit what sites and/or what data can be transmitted via access enabled by the credentials 124. In the illustrated example embodiment, the user has enabled restrictions, though the sites are not displayed on the screen display 500 in the illustrated embodiment. It should be understood that this example is merely illustrative and should not be construed as being limiting in any way.

The network access management window 502 also can include a UI control 520 to submit the options and/or parameters tailored via the network access management window 502. Thus, for example, the user or other entity can select the UI control 520 to cause the user device 116 to submit the various parameters configured via the network access management window 502 to the network access management service 108 as and/or with the management request 122, whereby the network access management service 108 can be configured to use the parameters and/or information when creating the credentials 124 as illustrated and described herein. Thus, selection of the UI control 520 can cause the user device 116 to request creation of the credentials 124 as illustrated and described herein. It should be understood that this example is illustrative, and therefore should not be construed as being limiting in any way.

The network access management window 502 also can include a UI control 522 to cancel the network access management and/or to close or dismiss the network access management window 502. Thus, for example, the user or other entity can select the UI control 522 to cause the user device 116 to close the network access management window 502 when the desired information has been obtained via the network access management window 502, when the user or other entity wishes to cancel management of the wireless access, when the user or other entity wishes to close the network access management window 502 for other reasons, and/or at other times at which the UI control 522 is selected. Because additional or alternative controls can be included in the network access management window 502, it should be understood that the example embodiment shown in FIG. 5 is illustrative and therefore should not be construed as being limiting in any way.

Figure 6:
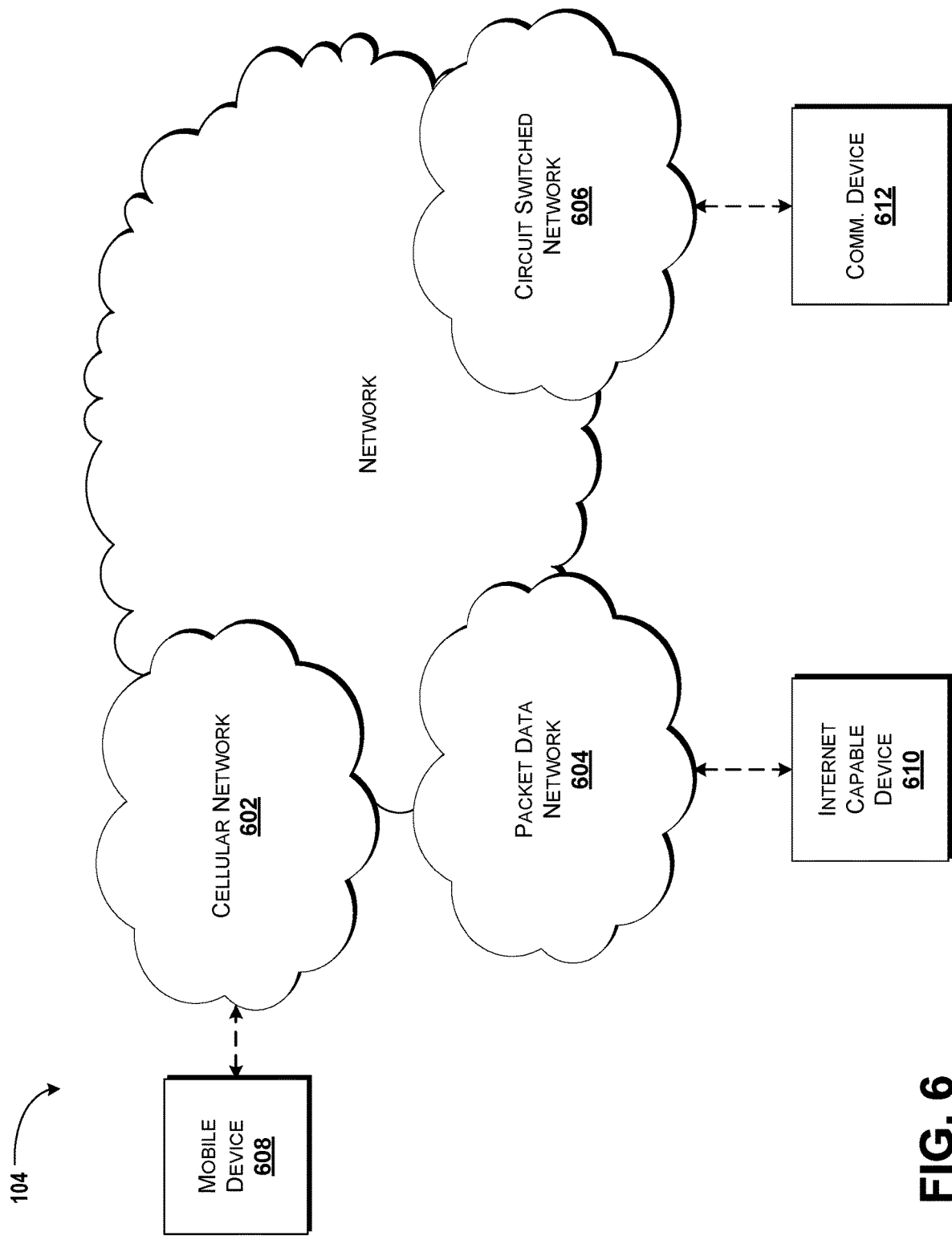
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards, 5G mobile communications standards, 6G mobile standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
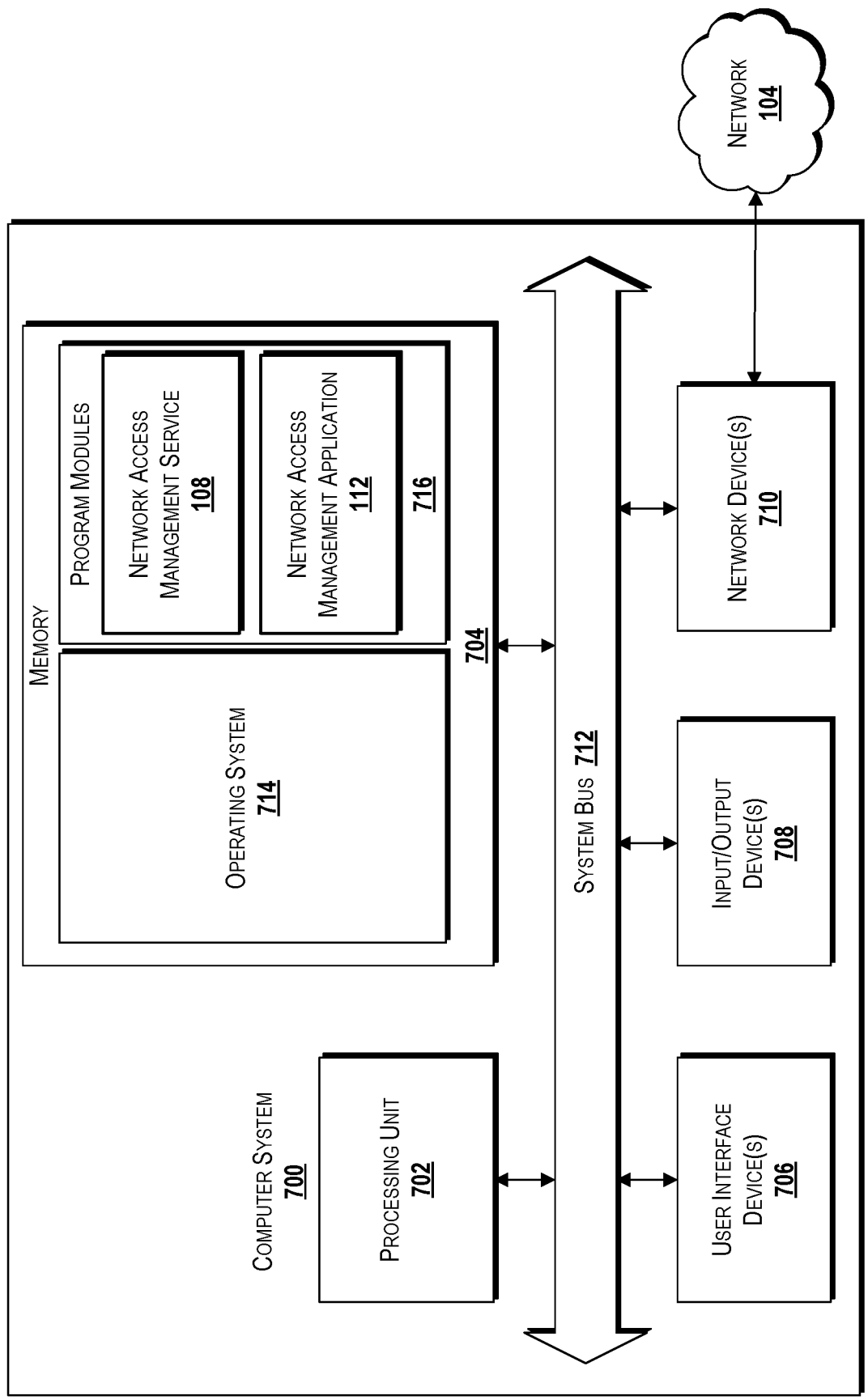
FIG. 7 is a block diagram illustrating an example computer system configured to provide network access management, according to some illustrative embodiments of the concepts and technologies described herein.

FIG. 7 is a block diagram illustrating a computer system 700 configured to provide the functionality described herein for providing network access management, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the network access management service 108 and/or the network access management application 112. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, and 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the management request 122, the credentials 124, the update 126, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
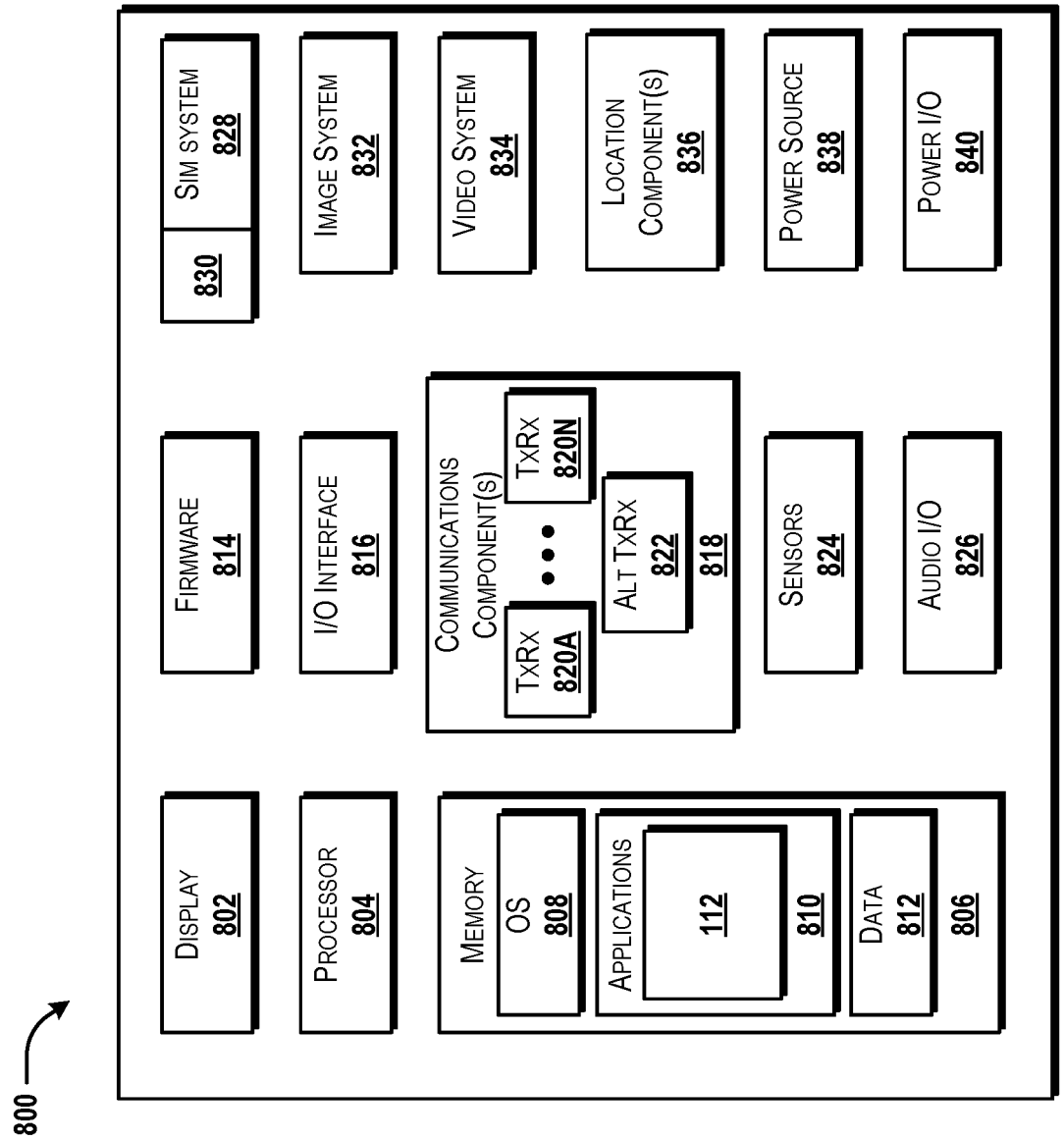
FIG. 8 is a block diagram illustrating an example mobile device configured to interact with a network access management application and/or a network access management service, according to some illustrative embodiments of the concepts and technologies described herein.

Turning now to FIG. 8, an illustrative mobile device 800 and components thereof will be described. In some embodiments, the gateway device 110, the user device 116, and/or the guest user device 120 described above with reference to FIGS. 1-5 can be configured as and/or can have an architecture similar or identical to the mobile device 800 described herein in FIG. 8. It should be understood, however, that the gateway device 110, the user device 116, and/or the guest user device 120 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, parameters for credentials 124, passwords, login IDs, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the network access management service 108, the network access management application 112, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the network access management service 108, the network access management application 112, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, the management request 122, the credentials 124, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, 6G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
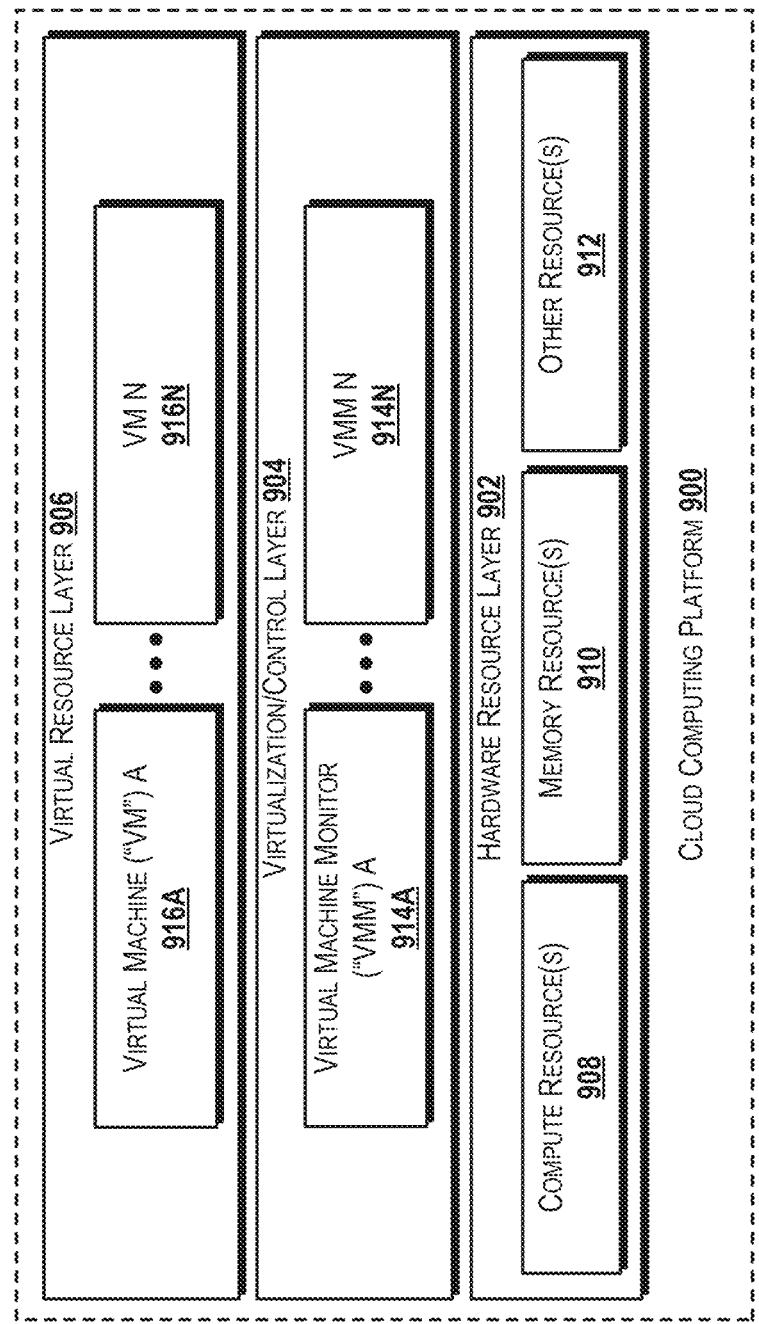
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for network access management and/or for interacting with the network access management application 112 and/or the network access management service 108. Thus, it can be appreciated that in some embodiments of the concepts and technologies disclosed herein, the cloud computing platform 900 illustrated in FIG. 9 can be used to provide the functionality described herein with respect to the server computer 102, the gateway device 110, the user device 116, and/or the guest user device 120.

The cloud computing platform 900 thus may be utilized to execute any aspects of the software components presented herein. Thus, according to various embodiments of the concepts and technologies disclosed herein, the network access management service 108 and/or the network access management application 112 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the network access management service 108 and/or the network access management application 112 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 908 can be or can include one or more hardware components arranged in accordance with an ARM architecture, available for license from ARM HOLDINGS of Cambridge, United Kingdom. Alternatively, the compute resources 908 can be or can include one or more hardware components arranged in accordance with an x86 architecture, such as an architecture available from INTEL CORPORATION of Mountain View, California, and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the network access management service 108, the network access management application 112, or other applications or services including functionality illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the management request 122, the credentials 124, the update 126, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for providing network access management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
receiving a request to enable network access for a guest user device at a geographic location associated with a gateway device, determining, for the network access for the guest user device, connection parameters, wherein the connection parameters comprise an effective-from date and time, and an effective-to date and time, storing, at the gateway device, credentials associated with the guest user device, wherein the gateway device stores data defining limits associated with the network access for the guest user device, and wherein the limits comprise a date and time limit comprising a time range for which the credentials are valid, detecting, at the gateway device, a guest login using the credentials, enabling the network access for the guest user device, applying, to the network access, the limits, determining, at the gateway device, if the date and time limit is satisfied, if a determination is made that the date and time limit are not satisfied, terminating the network access for the guest user device and revoking the credentials, and if a determination is made that the date and time limit are satisfied, continuing to enable the network access for the guest user device.

2. The system of claim 1, wherein the limits associated with the network access further comprise a time limit comprising a total duration for which the network access has been used.

3. The system of claim 1, wherein the limits associated with the network access further comprise a data limit comprising a total amount of data transmitted by way of the network access.

4. The system of claim 1, wherein the limits associated with the network access further comprise a data limit comprising a list of permissible sites and resources and a list of impermissible sites and resources for the guest user device to access using the network access.

5. The system of claim 1, wherein determining the connection parameters comprises interacting with a user device associated with an owner of the gateway device, wherein the user device presents a user interface comprising options for defining:
the effective-from date and time;
the effective-to date and time;
time limits associated with the network access for the guest user device; and
data limits associated with the network access for the guest user device.

6. The system of claim 1, wherein the computer-executable instructions, when executed by the processor, cause the processor to perform operations further comprising obtaining, from a network access management service, the credentials, wherein the network access management service generates the credentials by performing operations comprising:
receiving, from the gateway device, a management request, the management request comprising date and time information, user information, time information, and data limits;
creating the credentials based on the management request; and
providing a copy of the credentials to the gateway device.

7. The system of claim 6, wherein revoking the credentials comprises:
generating an update that indicates that the credentials have been revoked; and sending the update to the network access management service.

8. A method comprising:
receiving, at a gateway device comprising a processor, a request to enable network access for a guest user device at a geographic location associated with the gateway device;
determining, by the processor and for the network access for the guest user device, connection parameters, wherein the connection parameters comprise an effective-from date and time, and an effective-to date and time;
storing, by the processor and at the gateway device, credentials associated with the guest user device, wherein the gateway device stores data defining limits associated with the network access for the guest user device, and wherein the limits comprise a date and time limit comprising a time range for which the credentials are valid;
detecting, by the processor and at the gateway device, a guest login using the credentials;
enabling, by the processor, the network access for the guest user device;
applying, by the processor and to the network access, the limits;
determining, by the processor and at the gateway device, if the date and time limit are satisfied;
if a determination is made that the date and time limit are not satisfied, terminating, by the processor, the network access for the guest user device and revoking the credentials; and
if a determination is made that the date and time limit are satisfied, continuing, by the processor, to enable the network access for the guest user device.

9. The method of claim 8, wherein the limits associated with the network access further comprise a time limit comprising a total duration for which the network access has been used.

10. The method of claim 8, wherein the limits associated with the network access further comprise a data limit comprising a total amount of data transmitted by way of the network access.

11. The method of claim 8, wherein the limits associated with the network access further comprise a data limit comprising a list of permissible sites and resources and a list of impermissible sites and resources for the guest user device to access using the network access.

12. The method of claim 8, wherein determining the connection parameters comprises interacting with a user device associated with an owner of the gateway device, wherein the user device presents a user interface comprising options for defining:
the effective-from date and time;
the effective-to date and time;
time limits associated with the network access for the guest user device; and
data limits associated with the network access for the guest user device.

13. The method of claim 8, further comprising:
obtaining, from a network access management service, the credentials, wherein the network access management service generates the credentials by performing operations comprising:
receiving, from the gateway device, a management request, the management request comprising date and time information, user information, time information, and data limits;

creating the credentials based on the management request; and providing a copy of the credentials to the gateway device.

14. A computer storage medium having computer-executable instructions stored thereon that, when executed by a processor, cause the processor to perform operations comprising:

receiving a request to enable network access for a guest user device at a geographic location associated with a gateway device;

determining, for the network access for the guest user device, connection parameters, wherein the connection parameters comprise an effective-from date and time, and an effective-to date and time;

storing, at the gateway device, credentials associated with the guest user device, wherein the gateway device stores data defining limits associated with the network access for the guest user device, and wherein the limits comprise a date and time limit comprising a time range for which the credentials are valid;

detecting, at the gateway device, a guest login using the credentials;

enabling the network access for the guest user device;

applying, to the network access, the limits;

determining, at the gateway device, if the date and time limit are satisfied;

if a determination is made that the date and time limit are not satisfied, terminating the network access for the guest user device and revoking the credentials; and if a determination is made that the date and time limit are satisfied, continuing to enable the network access for the guest user device.

15. The computer storage medium of claim 14, wherein the limits associated with the network access further comprise a time limit comprising a total duration for which the network access has been used.

16. The computer storage medium of claim 14, wherein the limits associated with the network access further comprise a data limit comprising a total amount of data transmitted by way of the network access.

17. The computer storage medium of claim 14, wherein the limits associated with the network access further comprise a data limit comprising a list of permissible sites and resources and a list of impermissible sites and resources for the guest user device to access using the network access.

18. The computer storage medium of claim 14, wherein determining the connection parameters comprises interacting with a user device associated with an owner of the gateway device, wherein the user device presents a user interface comprising options for defining:

the effective-from date and time;

the effective-to date and time;

time limits associated with the network access for the guest user device; and data limits associated with the network access for the guest user device.

19. The computer storage medium of claim 14, wherein the computer-executable instructions, when executed by the processor, cause the processor to perform operations further comprising obtaining, from a network access management service, the credentials, wherein the network access management service generates the credentials by performing operations comprising:

receiving, from the gateway device, a management request, the management request comprising date and time information, user information, time information, and data limits;

creating the credentials based on the management request; and providing a copy of the credentials to the gateway device.

20. The computer storage medium of claim 19, wherein revoking the credentials comprises: generating an update that indicates that the credentials have been revoked; and sending the update to the network access management service.

\* \* \* \* \*